(12) United States Patent
Hayashi

(10) Patent No.: US 7,548,633 B2
(45) Date of Patent: Jun. 16, 2009

(54) DATA PROCESSING APPARATUS AND METHOD, DATA PROCESSING PROGRAM, AND STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 11/223,949

(22) Filed: Sep. 13, 2005

(65) Prior Publication Data

US 2006/0020809 A1 Jan. 26, 2006

Related U.S. Application Data

(62) Division of application No. 10/255,056, filed on Sep. 26, 2002, now Pat. No. 7,006,660.

(30) Foreign Application Priority Data

Sep. 27, 2001 (JP) .............................. 2001-297441
Sep. 19, 2002 (JP) .............................. 2002-273584

(51) Int. Cl.
*G06K 9/00* (2006.01)
*H04L 9/32* (2006.01)

(52) U.S. Cl. ...................................... 382/100; 713/176
(58) Field of Classification Search ................. 382/100, 382/232, 240, 309; 380/51, 54, 210, 252, 380/287; 358/3.28; 283/72, 74–81; 713/176, 713/179; 348/461, 463; 386/4, 52, 55; 715/208, 715/223, 235, 255, 723, 732; 717/110
See application file for complete search history.

(56) References Cited

U.S. PATENT DOCUMENTS

| | | | | |
|---|---|---|---|---|
| 6,278,385 B1 * | 8/2001 | Kondo et al. | ................... | 341/50 |
| 6,311,214 B1 * | 10/2001 | Rhoads | ...................... | 709/217 |
| 6,314,518 B1 * | 11/2001 | Linnartz | ..................... | 713/176 |
| 6,674,873 B1 * | 1/2004 | Donescu et al. | ............. | 382/100 |
| 6,826,290 B1 | 11/2004 | Murakami et al. | | |
| 2002/0001395 A1 | 1/2002 | Davis et al. | | |

FOREIGN PATENT DOCUMENTS

| | | |
|---|---|---|
| JP | 10-155151 | 6/1998 |
| JP | 11-317860 | 11/1999 |
| JP | 2000-224402 | 8/2000 |
| JP | 2001-060875 | 3/2001 |
| JP | 2001-257861 | 9/2001 |

* cited by examiner

*Primary Examiner*—Abolfazl Tabatabai
(74) *Attorney, Agent, or Firm*—Fitzpatrick, Cella, Harper & Scinto

(57) ABSTRACT

The present invention has an object to provide a data processing apparatus which can perform digital watermark embedding/extraction in accordance with manipulation, editing, and compression. To achieve the object, the data processing apparatus for performing compression processing on digital data comprises: a digital watermark extracting device extracting additional information, embedded as a digital watermark, from digital data; a digital watermark removing device removing the additional information, embedded as a digital watermark, from the digital data; an irreversible processing deice performing irreversible processing on the digital data; and a digital watermark embedding device embedding the additional information as a digital watermark in the irreversible-processed digital data.

5 Claims, 9 Drawing Sheets

| 0.1 | −0.7 | −0.7 | −0.4 |
|---|---|---|---|
| −0.4 | 0.0 | −0.2 | 0.8 |
| −0.2 | 0.9 | 0.3 | 0.1 |
| 0.8 | −0.3 | 0.4 | −0.6 |

*

$\alpha_i$:

| 10 | 10 | 20 | 10 |
|---|---|---|---|
| 10 | 10 | 20 | 20 |
| 10 | 10 | 10 | 10 |
| 10 | 10 | 10 | 10 |

+

$I_{3i,j}$:

| 118 | 119 | 51 | 49 |
|---|---|---|---|
| 119 | 120 | 50 | 49 |
| 121 | 122 | 120 | 119 |
| 120 | 122 | 121 | 119 |

↓

$I_{4i,j}$:

| 119 | 112 | 37 | 45 |
|---|---|---|---|
| 115 | 120 | 46 | 65 |
| 119 | 131 | 123 | 120 |
| 128 | 119 | 125 | 113 |

| 0.1 | −0.7 | −0.7 | −0.4 |
|---|---|---|---|
| −0.4 | 0.0 | −0.2 | 0.8 |
| −0.2 | 0.9 | 0.3 | 0.1 |
| 0.8 | −0.3 | 0.4 | −0.6 |

∗

$\alpha_i$:

| 10 | 10 | 20 | 10 |
|---|---|---|---|
| 10 | 10 | 20 | 20 |
| 10 | 10 | 10 | 10 |
| 10 | 10 | 10 | 10 |

−

$I1_{i,j}$:

| 119 | 112 | 37 | 45 |
|---|---|---|---|
| 115 | 120 | 46 | 65 |
| 119 | 131 | 123 | 120 |
| 128 | 119 | 125 | 113 |

↓

$I2_{i,j}$:

| 118 | 119 | 51 | 49 |
|---|---|---|---|
| 119 | 120 | 50 | 49 |
| 121 | 122 | 120 | 119 |
| 120 | 122 | 121 | 119 |

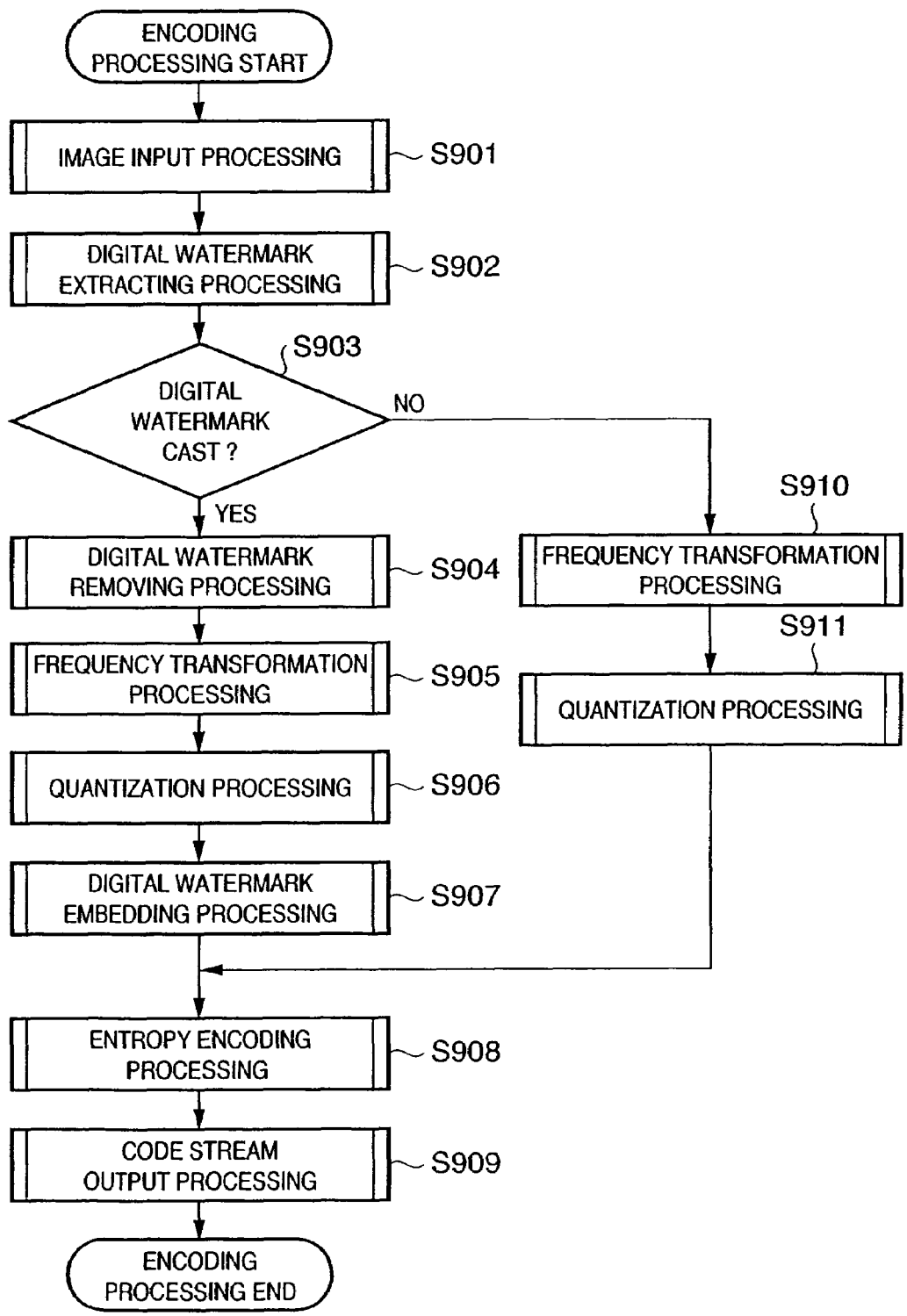

DATA PROCESSING APPARATUS AND METHOD, DATA PROCESSING PROGRAM, AND STORAGE MEDIUM

This application is a division of application Ser. No. 10/255,056 filed Sep. 26, 2002.

FIELD OF THE INVENTION

The present invention relates to a data processing apparatus and method as well as a data processing program and storage medium, which can ensure extraction of an entire digital watermark from digital data even after an arbitrary manipulation, editing or compression processing is performed on the digital data.

BACKGROUND OF THE INVENTION

Along with the rapid development and dissemination of computers and computer networks in recent years, various types of data, e.g., character data, image data, audio data and so forth, are digitalized. While digital data is resistant to deterioration with age and can be stored intact for good, it allows easy copying, thus causing serious problems in copyright protection. For this reason, the importance of the security techniques for copyright protection is rapidly increasing.

One of the techniques for copyright protection is "digital watermarking." Digital watermarking is a technique for tracking down an unauthorized use of digital image data, audio data, character data and so on acquired by illegal copying, and is realized by embedding a name of a copyright holder or an ID of a purchaser in the digital data in a manner that it is not perceivable by humans. Since a digital watermark is exposed to various attacks, it must have resistance to attacks.

Attacks to digital watermarks are largely categorized into two types: one being a deliberate attack and the other being an indeliberate attack. The deliberate attack is an action taken by an attacker with an aggressive intention to eliminate or destruct the digital watermark. The indeliberate attack is an action taken by an ordinary user who performs general manipulation or editing on digital data, which ultimately causes elimination or destruction of the digital watermark. Examples thereof are irreversible compression, DA/AD conversion, or re-sampling of digital data. The embedded digital watermark must be resistant to either of the attacks.

As described above, fundamentally digital watermarks must be resistant to any kind of attacks and correct digital watermarks must be extracted from attacked digital data. However, in reality, it is difficult to realize digital watermarks resistant to all the attacks. Furthermore, in a case where an attack is repeated plural numbers of times, it is difficult to realize digital watermarks resistant to the plural numbers of times of attacks.

Meanwhile, digital data enables general users to perform manipulation and editing relatively easily. This is a significant advantage of digital data compared to analog data. However, performing manipulation or editing on digital data corresponds to the aforementioned indeliberate attack on digital watermarks. In other words, in a case where excessive manipulation/editing is performed on digital data or manipulation/editing is repeatedly performed on digital data, the digital watermark is often eliminated. On the other hand, it is necessary to allow manipulation/editing on digital data at liberty.

Take an example of image data, which is picked up by a digital camera and includes a photographer's ID as copyright information. It is preferable that the image data be manipulatable and editable by the photographer and that the digital watermark be extractable after the manipulation or editing is performed. Furthermore, in a case where image data including a digital watermark is encoded by an irreversible compression method, e.g., JPEG or the like, and stored, it is preferable that the digital watermark be correctly extractable from the stored image data. However, conventionally it has been difficult to realize such operation because these correspond to the aforementioned indeliberate attacks.

SUMMARY OF THE INVENTION

The present invention has been proposed in view of the above conventional problems, and has as its object to provide a data processing apparatus and method as well as a data processing program and storage medium, which can perform digital watermark embedding/extraction in accordance with manipulation, editing, or compression processing.

In order to solve the aforementioned problems and attain the object, the data processing apparatus of the present invention has the following configuration according to the first aspect.

More specifically, the data processing apparatus for performing manipulating or editing on digital data, comprises: a digital watermark extracting device arranged to extract first additional information embedded in inputted digital data; a digital watermark removing device arranged to remove a digital watermark from the digital data based on the information extracted by the digital watermark extracting device; a manipulating/editing device arranged to manipulate or edit the digital data, from which the digital watermark has been removed by the digital watermark removing device; a digital watermark embedding device arranged to embedded second additional information as a digital watermark in the digital data, which has been manipulated or edited by the manipulating/editing device; and an output device arranged to output the digital data, in which the digital watermark has been embedded by the digital watermark embedding device.

Furthermore, the data processing apparatus of the present invention has the following configuration according to the second aspect.

More specifically, the data processing apparatus for performing compression processing on digital data, comprises: a digital watermark extracting device arranged to extract additional information, embedded as a digital watermark, from the digital data; a digital watermark removing device arranged to remove the additional information, embedded as a digital watermark, from the digital data; an irreversible processing device arranged to perform irreversible processing on the digital data; and a digital watermark embedding device arranged to embed the additional information as a digital watermark in the digital data, on which irreversible processing has been performed by the irreversible processing device.

Furthermore, the data processing apparatus of the present invention has the following configuration according to the third aspect.

More specifically, the data processing apparatus for performing compression encoding processing on digital data, comprises: a digital watermark extracting device arranged to extract first additional information, embedded as a digital watermark, from inputted digital data; a digital watermark removing device arranged to remove the digital watermark from the inputted digital data based on the information extracted by the digital watermark extracting device; a frequency transformation device arranged to perform frequency transformation on the data, from which the digital watermark has been removed by the digital watermark removing device; a quantization device arranged to perform quantization processing on the data, on which frequency transformation has been performed by the frequency transformation device; a digital watermark embedding device arranged to embed the first additional information in the data, on which quantization processing has been performed by the quantization device; an entropy encoding device arranged to perform entropy encoding on the data, on which the digital watermark has been embedded by the digital watermark embedding device; and a code stream output device arranged to output a code stream, on which entropy encoding processing has been performed by the entropy encoding device.

Furthermore, the data processing apparatus of the present invention has the following configuration according to the fourth aspect.

More specifically, the data processing apparatus for performing compression encoding processing on digital data, comprises: a frequency transformation device arranged to perform frequency transformation on inputted digital data; a digital watermark extracting device arranged to extract first additional information, embedded as a digital watermark, from the data on which frequency transformation has been performed by the frequency transformation device; a digital watermark removing device arranged to remove the digital watermark from the inputted digital data based on the information extracted by the digital watermark extracting device; a quantization device arranged to perform quantization processing on the data, from which the digital watermark has been removed by the digital watermark removing device; a digital watermark embedding device arranged to embed the first additional information in the data, on which quantization processing has been performed by the quantization device; an entropy encoding device arranged to perform entropy encoding on the data, on which the digital watermark has been embedded by the digital watermark embedding device; and a code stream output device arranged to output a code stream, on which entropy encoding processing has been performed by the entropy encoding device.

Furthermore, the data processing method of the present invention has the following configuration according to the first aspect.

More specifically, the data processing method comprises: an input step of inputting digital data; a digital watermark extracting step of extracting first additional information embedded in the inputted digital data; a digital watermark removing step of removing a digital watermark from the digital data based on the information extracted in the digital watermark extracting step; a manipulating/editing step of manipulating or editing the digital data, from which the digital watermark has been removed in the digital watermark removing step; a digital watermark embedding step of embedding second additional information as a digital watermark in the digital data, which has been manipulated or edited in the manipulation/editing step; and an output step of outputting the digital data, in which the digital watermark has been embedded by the digital watermark embedding step.

Furthermore, the data processing program of the present invention has the following configuration according to the first aspect.

More specifically, the data processing program causes a computer to execute: an input step of inputting digital data; a digital watermark extracting step of extracting first additional information embedded in the inputted digital data; a digital watermark removing step of removing a digital watermark from the digital data based on the information extracted in the digital watermark extracting step; a manipulating/editing step of manipulating or editing the digital data, from which the digital watermark has been removed in the digital watermark removing step; a digital watermark embedding step of embedding second additional information as a digital watermark in the digital data, which has been manipulated or edited in the manipulation/editing step; and an output step of outputting the digital data, in which the digital watermark has been embedded by the digital watermark embedding step.

Furthermore, the storage medium of the present invention has the following configuration according to the first aspect.

More specifically, the storage medium stores the above-described data processing program so as to be computer readable.

Furthermore, the data processing method of the present invention has the following configuration according to the second aspect.

More specifically, the data processing method for performing compression processing on digital data, comprises: a digital watermark extracting step of extracting additional information, embedded as a digital watermark, from the digital data; a digital watermark removing step of removing the additional information, embedded as a digital watermark, from the digital data; an irreversible processing step of performing irreversible processing on the digital data; and a digital watermark embedding step of embedding the additional information as a digital watermark in the digital data, on which irreversible processing has been performed in the irreversible processing step.

Furthermore, the data processing method of the present invention has the following configuration according to the third aspect.

More specifically, the data processing method for performing compression encoding processing on digital data, comprises: a digital watermark extracting step of extracting first additional information, embedded as a digital watermark, from inputted digital data; a digital watermark removing step of removing the digital watermark from the inputted digital data based on the information extracted in the digital watermark extracting step; a frequency transformation step of performing frequency transformation on the data, from which the digital watermark has been removed in the digital watermark removing step; a quantization step of performing quantization processing on the data, on which frequency transformation has been performed in the frequency transformation step; a digital watermark embedding step of embedding the first additional information in the data, on which quantization processing has been performed in the quantization step; an entropy encoding step of performing entropy encoding on the data, on which the digital watermark has been embedded in the digital watermark embedding step; and a code stream output step of outputting a code stream, on which entropy encoding processing has been performed in the entropy encoding step.

Furthermore, the data processing method of the present invention has the following configuration according to the fourth aspect.

More specifically, the data processing method for performing compression encoding processing on digital data, comprises: a frequency transformation step of performing frequency transformation on inputted digital data; a digital watermark extracting step of extracting first additional information, embedded as a digital watermark, from the data on which frequency transformation has been performed in the frequency transformation step; a digital watermark removing step of removing the digital watermark from the inputted digital data based on the information extracted in the digital watermark extracting step; a quantization step of performing quantization on the data, from which the digital watermark has been removed in the digital watermark removing step; a digital watermark embedding step of embedding the first additional information in the data, on which quantization processing has been performed in the quantization step; an entropy encoding step of performing entropy encoding on the data, on which the digital watermark has been embedded in the digital watermark embedding step; and a code stream output step of outputting a code stream, on which entropy encoding processing has been performed in the entropy encoding step.

Furthermore, the data processing program of the present invention has the following configuration according to the second aspect.

More specifically, the data processing program read and executed by a computer to function as a data processing apparatus for performing compression encoding processing on digital data, comprises: program codes for a digital watermark extracting step of extracting additional information, embedded as a digital watermark, from the digital data; program codes for a digital watermark removing step of removing the additional information, embedded as a digital watermark, from the digital data; program codes for an irreversible processing step of performing irreversible processing on the digital data; and program codes for a digital watermark embedding step of embedding the additional information as a digital watermark in the digital data, on which irreversible processing has been performed in the irreversible processing step.

Furthermore, the data processing program of the present invention has the following configuration according to the third aspect.

More specifically, the data processing program read and executed by a computer to function as a data processing apparatus for performing compression encoding processing on digital data, comprises: program codes for a digital watermark extracting step of extracting first additional information, embedded as a digital watermark, from inputted digital data; program codes for a digital watermark removing step of removing the digital watermark from the inputted digital data based on the information extracted in the digital watermark extracting step; program codes for a frequency transformation step of performing frequency transformation on the data, from which the digital watermark has been removed in the digital watermark removing step; program codes for a quantization step of performing quantization processing on the data, on which frequency transformation has been performed in the frequency transformation step; program codes for a digital watermark embedding step of embedding the first additional information in the data, on which quantization processing has been performed in the quantization step; program codes for an entropy encoding step of performing entropy encoding on the data, on which the digital watermark has been embedded in the digital watermark embedding step; and program codes for a code stream output step of outputting a code stream, on which entropy encoding processing has been performed in the entropy encoding step.

Furthermore, the data processing program of the present invention has the following configuration according to the fourth aspect.

More specifically, the data processing program read and executed by a computer to function as a data processing apparatus for performing compression encoding processing on digital data, comprises: program codes for a digital data input step of inputting digital data; program codes for a frequency transformation step of performing frequency transformation on the digital data inputted in the digital data input step; program codes for a digital watermark extracting step of extracting first additional information, embedded as a digital watermark, from the data on which frequency transformation has been performed in the frequency transformation step; program codes for a digital watermark removing step of removing the digital watermark from the inputted digital data based on the information extracted in the digital watermark extracting step; program codes for a quantization step of performing quantization on the data, from which the digital watermark has been removed in the digital watermark removing step; program codes for a digital watermark embedding step of embedding the first additional information in the data, on which quantization processing has been performed in the quantization step; program codes for an entropy encoding step of performing entropy encoding on the data, on which the digital watermark has been embedded in the digital watermark embedding step; and program codes for a code stream output step of outputting a code stream, on which entropy encoding processing has been performed in the entropy encoding step.

Furthermore, the storage medium of the present invention has the following configuration.

More specifically, the storage medium stores each of the above-described data processing programs so as to be computer readable.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows a detailed example of digital watermark embedding according to the first embodiment;

FIG. 5 shows a detailed example of removing a digital watermark according to the second embodiment;

FIG. 9 is a flowchart describing an image encoding processing according to the third embodiment.

DETAILED DESCRIPTION OF THE PREFERRED EMBODIMENTS

Preferred embodiments of the present invention will now be described in detail in accordance with the accompanying drawings.

First Embodiment

Figure 1:
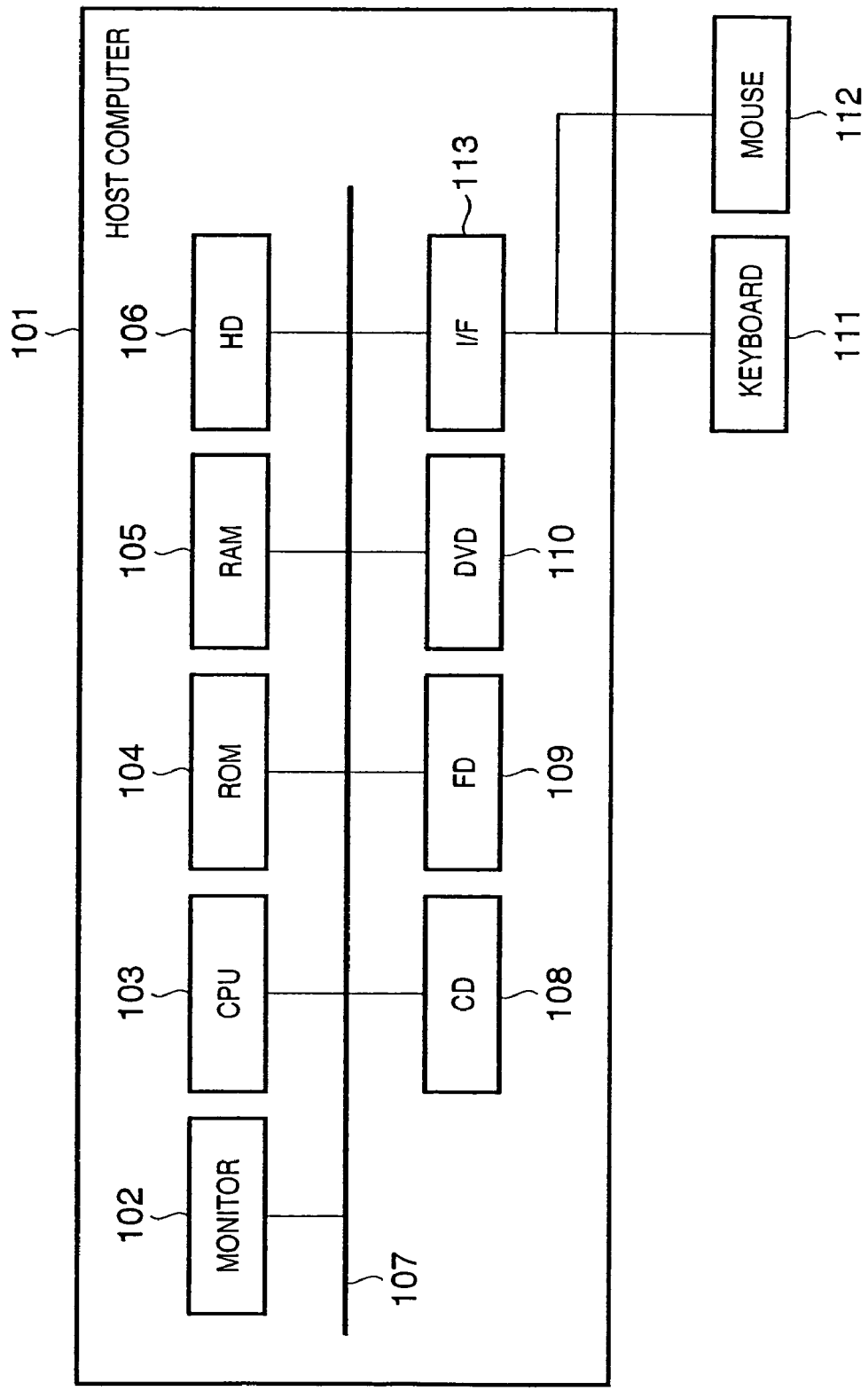
FIG. 1 is a block diagram showing an overall construction of an image processing apparatus according to the first embodiment of the present invention.

FIG. 1 is a block diagram showing an overall construction of an image processing apparatus according to the first embodiment. In FIG. 1, the host computer 101 is, for instance, a personal computer used in general.

In the host computer 101, each of the blocks which will be described later is connected through a bus 107 for transferring various data.

Reference numeral 103 denotes a CPU which can control operation of each block of the host computer or execute a program stored in the host computer.

Reference numeral 104 denotes ROM where necessary image processing programs are stored in advance.

Reference numeral 105 denotes RAM where programs and image data subjected to processing are temporarily stored to be processed by the CPU 103.

Reference numeral 106 denotes a hard disk (HD) which can store in advance programs or image data transferred to the RAM or the like, or store processed image data.

Reference numeral 108 denotes a CD drive which can read or write data, stored in a CD (CD-R) serving as one of an external storage medium.

Reference numeral 109 denotes a FD drive which can read or write data stored in a floppy disk, as similar to the CD drive 108. Reference numeral 110 denotes a DVD drive which can read or write data stored in a DVD, as similar to the CD drive 108. Note in a case where programs for image editing are stored in a CD, FD, or DVD, the programs are installed in the HD 116 and transferred to the RAM 105 as necessary.

Reference numeral 113 denotes an interface unit (I/F) connected to a keyboard 111 and a mouse 112 for receiving inputted instructions therefrom.

Image Editing Apparatus

Next, an image editing apparatus according to the first embodiment is briefly described. First, processing performed by the image editing apparatus is briefly explained. A digital watermark is extracted from inputted image data; the extracted digital watermark is removed once (image data before the digital watermark embedding is reconstructed); editing is performed on the image data; and the extracted digital watermark is embedded back to the image data.

Figure 2:
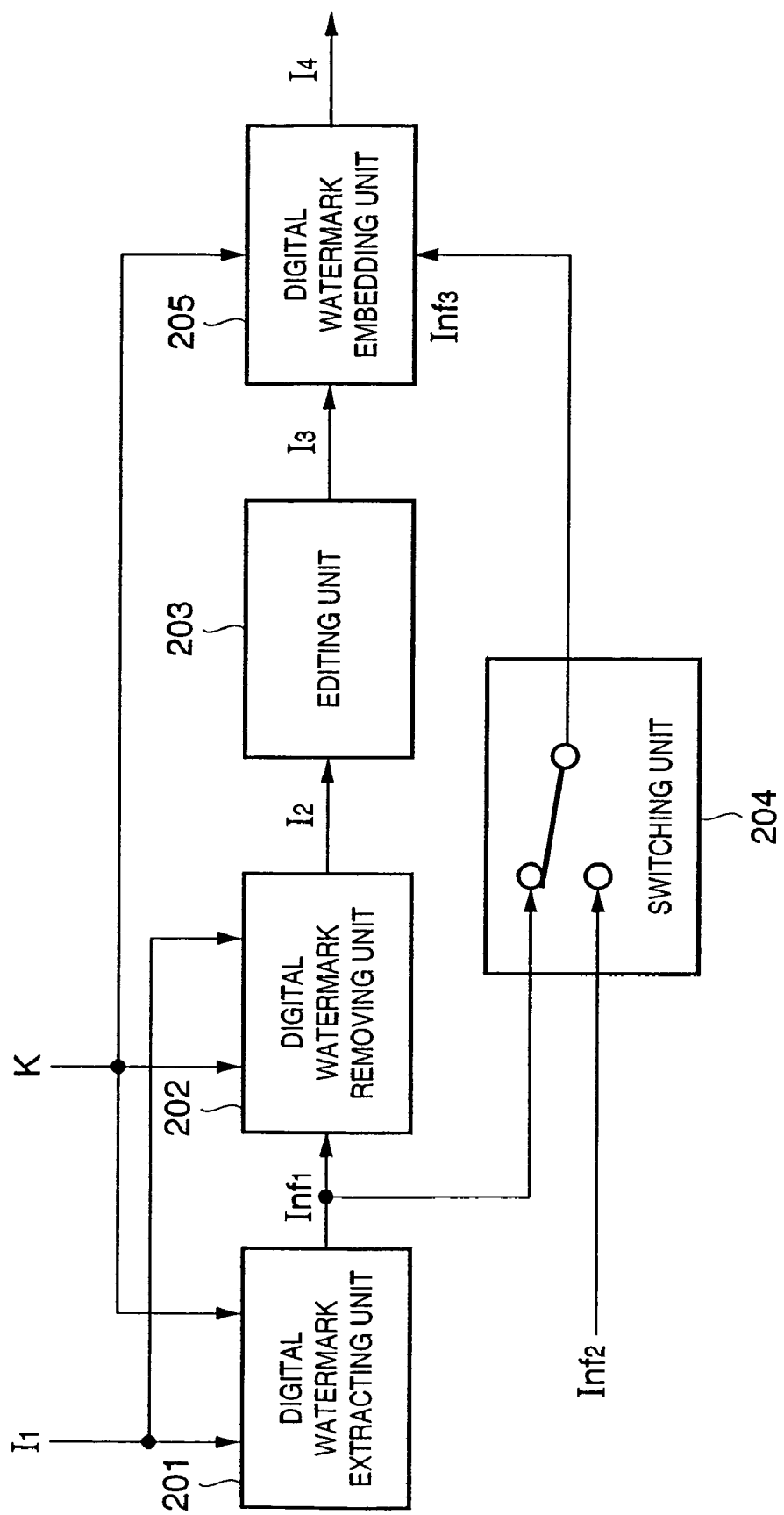
FIG. 2 is a block diagram showing an image editing apparatus according to the first embodiment.

FIG. 2 is a block diagram showing an internal construction of the image editing apparatus. Processing performed by the image editing apparatus is described with reference to FIG. 2.

The image editing apparatus shown in FIG. 2 comprises a digital watermark extracting unit 201, digital watermark removing unit 202, editing unit 203, switching unit 204, and digital watermark embedding unit 205.

In this image editing apparatus, an image I1 and a key K are inputted. To simplify the description, assume that the image I1 is multi-valued image data in a gray scale, whose one pixel is expressed by 8 bits. However, the present invention is not limited to this, but multi-valued image data in a gray scale having other numbers of bits may be used. Further, in a case where color image data consisting of plural color components is inputted, one or plural color components of the image data may be selected as input image data. The key K1 is used to extract a digital watermark embedded in the image I1, and details thereof will be described later. The inputted image I1 and key K are then inputted to the digital watermark extracting unit 201. The inputted image I1 is also inputted to a digital watermark removing unit 202.

First, the digital watermark extracting unit 201 is described. When the image I1 and key K are inputted to the digital watermark extracting unit 201, embedded additional information Inf1 is extracted from the inputted image I1 by using the key K, and the extracted additional information Inf1 is outputted. The extracted additional information Inf1 is inputted to the digital watermark removing unit 202. Detailed operation of the digital watermark extracting unit 201 will be described later.

Next, the digital watermark removing unit 202 is described. When the image I1, key K, and additional information Inf1 are inputted to the digital watermark removing unit 202, the digital watermark is removed from the image I1 by using the key K and additional information Inf1, and an image I2 where the digital watermark has been removed is outputted. The image I2, where the digital watermark has been removed, is exactly the same data as the image before the digital watermark is embedded. Detailed operation of the digital watermark removing unit 202 will be described later.

Next, the editing unit 203 is described. When the image I2, from which the digital watermark is removed in the previous step, is inputted to the editing unit 203, arbitrary editing processing is performed on the inputted image I2, and an edited image I3 is outputted. An editing processing incorporated inside the editing apparatus or a processing incorporated in an external unit of the editing apparatus may be performed. For instance, various processing such as noise removal, color correction, rotation, scaling and so on, or a combination of these processing can be executed.

Next, the switching unit 204 is described. In the switching unit 204, the additional information Inf1 outputted by the digital watermark extracting unit 201 in the previous step and additional information Inf2 which is different from the information Inf1 are inputted, and one of these information is selected and outputted. Herein, the additional information Inf1 is additional information extracted by the digital watermark extracting unit 201. In a case where additional information is embedded in the image I1 inputted to the editing apparatus and additional information Inf1 is extracted, the switching unit 204 selects the additional information Inf1 to be outputted. On the other hand, in a case where additional information is not embedded in the image I1, additional information Inf2 is selected to be outputted. The additional information Inf2 may be inputted by using the keyboard 111 and mouse 112, or information recorded in the ROM 104 or RAM 105 in advance may be used. The selected information (Inf1 or Inf2) is outputted as Inf3.

Note although the first embodiment has described an example in which the additional information Inf1 embedded in the image I1 is always embedded back to the image, the present invention is not limited to this. For instance, even if additional information Inf1 is embedded in the image I1, Inf2 may be embedded back to the image. In other words, by utilizing the image editing apparatus of the first embodiment, it is possible to rewrite the additional information embedded as a digital watermark.

Next, the digital watermark embedding unit 205 is described. When the image I3, key K, and additional information Inf3 are inputted to the digital watermark embedding unit 205, the additional information Inf3 is embedded as a digital watermark in the image I3 by using the key K, and an image I4 where the digital watermark is embedded is outputted. Detailed operation of the digital watermark embedding unit 205 will be described later.

As described above, the image editing apparatus according to the first embodiment performs editing on the image I1 and generates the image I4 where the additional information Inf3 (either Inf1 or Inf2) is embedded.

Details of Digital Watermark Embedding Processing

Herein, details of the digital watermark embedding processing are described with reference to an example.

Assume a case of embedding n-bit information Inf3 in the image I3. The image I3 is divided into n number of non-overlapping areas I3j (j=1, 2, . . . n). The following equation is executed as digital watermark embedding processing:

$$I4,j,i=I3,j,i+cj*ai*xi \quad (1)$$

Herein, j is a positive number specifying an area and a bit position of the additional information Inf3; i is a positive number indicating a pixel position; I3,j,i represents an image before digital watermark embedding; I4,j,i represents an image after digital watermark embedding; cj is a constant being +1 when Inf3,j is bit 1, and being −1 when Inf3,j is bit 0; ai is a weighting factor; and xi is a pseudo-random number sequence ranging −1 to +1. The key K is used as an initial value for generating the pseudo-random number sequence xi. The pseudo-random number sequence xi is called a carrier signal for embedding a digital watermark.

Details of Digital Watermark Extracting Processing

Next, details of the digital watermark extracting processing are described with reference to an example.

In the inputted image I1, additional information is embedded as a digital watermark. In order to extract the digital watermark embedded by equation (1), PFA is calculated from the carrier signal x and image I1 inputted to the digital watermark extracting unit. Based on the calculation result, it is determined whether or not a digital watermark is embedded, and if a digital watermark is embedded, it is determined whether the bit is 0 or 1.

Herein, PFA is a probability of determination being made that a digital watermark is embedded despite the fact that a digital watermark is not embedded. To calculate the probability, a method called test statistic is adopted. The test statistic is a known technique for experts in this field. As an example of using the test statistic in digital watermark extraction, detailed descriptions are found in "A method for signature embedding on digital images" by I. Pitas, I.C.I.I.P. Proceedings, pages 215 to 218, September 1996. By the test statistic, a test value qj is calculated for each bit. When a digital watermark is not embedded in the digital data, the test value qj has a standard normal probability distribution where the mean is 0 and variance is 1. However, when a digital watermark is embedded in the digital data, the test value qj has a normal probability distribution where the mean is not 0 and variance is 1. With the use of the above characteristics, whether or not a digital watermark is embedded is determined based on how far the calculated test value qj is from 0.

Furthermore, by using the calculated test value qj, it is possible to calculate the information embedded as a digital watermark. Assuming a case where a digital watermark is embedded by equation (1), when qj is a positive value, the bit is 1, while when qj is a negative value, the bit is 0.

Details of Digital Watermark Removing Processing

Next, details of the digital watermark removing processing are described with reference to an example. The digital watermark removing processing is executed by the following equation with the use of the additional information Inf1, extracted in the above-described digital watermark extracting processing.

$$I2,j,i=I1,j,i-cj*ai*xi \quad (2)$$

Herein, I2,j,i represents reconstructed image data; I1,j,i represents image data inputted to an image reconstruction apparatus; cj is a constant being +1 when the bit in the additional information Inf1 extracted by the digital watermark extracting unit is 1, and being −1 when the bit is 0; and ai and xi are the same as that of equation (1).

Therefore, if the additional information Inf1 is correctly extracted by the above processing, the image I1 before the digital watermark embedding can be reconstructed, and the same data as the data before the digital watermark embedding can be obtained.

Furthermore, extraction or removal of a digital watermark is possible only when the key K, used when the digital watermark is embedded, is employed. In other words, only a user who owns the key K can execute editing processing. Accordingly, the key K can be employed as an editorial right of the image I1. More specifically, the key K, basically stored safely as confidential information, may be distributed only to a user who is allowed to edit the image I1. Accordingly, a user who can edit the image I1 can be specified.

As described above, in a case of using the key K as the editorial right, when the digital watermark extracting unit 201 determines that a digital watermark is embedded (correct key K is used), processing subsequent to the digital watermark removing unit 202 is executed, but when the unit 201 determines that a digital watermark is not embedded (incorrect key is used), the subsequent processing can be terminated.

Next, digital watermark embedding shown in equation (1) and original image reconstruction shown in equation (2) are described in detail.

FIG. 4 shows a detailed example of digital watermark embedding shown in equation (1). Each matrix indicates a part of an image. As the bit information, the case of bit 1, i.e., cj=+1, is shown. FIG. 5 shows a detailed example of removing the digital Nwatermark embedded in the example shown in FIG. 4. As the bit information, bit 1 is extracted in advance. As can be seen from FIGS. 4 and 5, normally, an embedded digital watermark can be totally removed and an original image can be reconstructed.

Image Editing Processing

Figure 3:
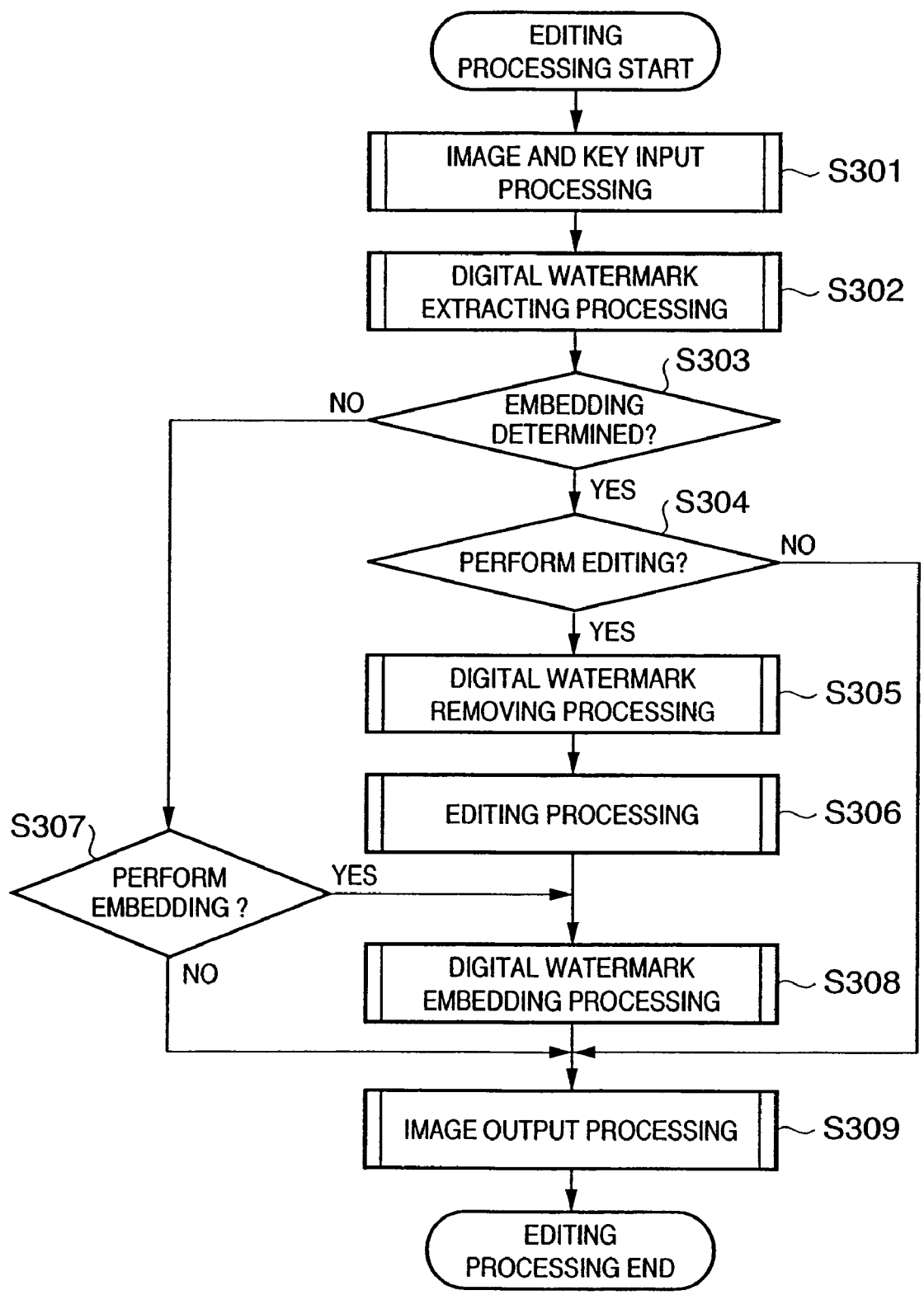
FIG. 3 is a flowchart describing an image editing processing according to the first embodiment.

Next, descriptions are provided with reference to FIG. 3 on the processing performed in a case where the image editing apparatus described in the first embodiment is executed by software. FIG. 3 is a flowchart showing editing processing according to the first embodiment.

First, the image data I1 subjected to editing and the key K for extracting or removing a digital watermark are inputted (step S301). The inputted image data I1 and key K are stored in the RAM 105. Information embedded as a digital watermark is extracted from the inputted image data I1 by using the key K (step S302). Then, it is determined whether or not a digital watermark is embedded in the image data I1 (step S303). Only when a digital watermark is embedded in the image data I1 and the correct key K is inputted, the determination result becomes Y; otherwise, the determination result becomes N.

In a case where a digital watermark is embedded in the image data I1, whether or not to perform editing is selected (step S304). Meanwhile, in a case where a digital watermark is not embedded in the image data I1, whether or not to perform digital watermark embedding is selected (step S307). If it is selected to perform editing in step S304, digital watermark removing processing is executed (step S305). On the contrary, if it is selected not to perform editing, the inputted image data I1 is outputted without any processing (step S309).

The image data I1, from which the digital watermark has been removed, is outputted as image data I2, and stored in the RAM 105. Then, arbitrary editing processing is performed on the image data I2, and stored as image data I3 in the RAM 105 (step S306).

The image data I3, on which arbitrary editing processing has been performed, is subjected to digital watermark embedding processing (step S308). In a case where the additional information Inf1 is extracted in the extraction step S302 and stored in the RAM 105, the additional information Inf1 is embedded as a digital watermark. On the other hand, in a case where no additional information Inf1 is extracted and digital watermark embedding is newly selected, new additional information Inf2 is inputted by using the keyboard 111 and mouse 112, or additional information Inf2 stored in the ROM 104 or HD 106 in advance may be embedded. The additional information Inf1 or Inf2 selected in any of the above-described method is embedded in the image data I3 as additional information Inf3 serving as a digital watermark. Then, an image I4, in which the additional information Inf3 has been embedded, is outputted (step S309).

Second Embodiment

The foregoing first embodiment has described an image editing apparatus which ensures correct extraction of an entire digital watermark from digital-watermarked image data even after various manipulation or editing is performed on the image data. The second embodiment provides an image encoding apparatus which ensures correct extraction of an entire digital watermark from image data in a case where the image data including a digital watermark is encoded by irreversible compression represented by JPEG or the like.

Image Encoding Apparatus

Figure 6:
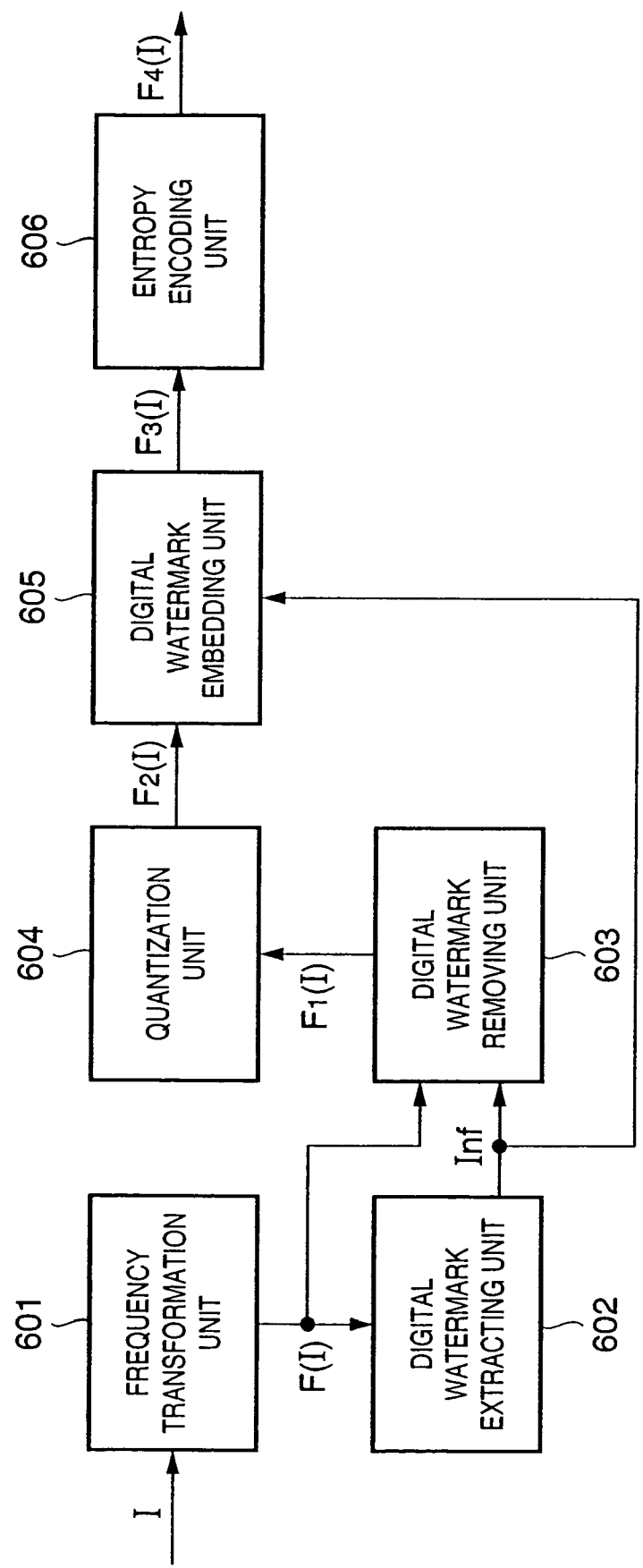
FIG. 6 is a block diagram showing an image encoding apparatus according to the second embodiment.

FIG. 6 shows an internal configuration of the image encoding apparatus according to the second embodiment. The processing of the image encoding apparatus is described with reference to FIG. 6.

The image encoding apparatus shown in FIG. 6 comprises: a frequency transformation unit 601, digital watermark extracting unit 602, digital watermark removing unit 603, quantization unit 604, digital watermark embedding unit 605, and entropy encoding unit 606.

An image I is inputted to the image encoding apparatus. To simplify the description, assume that the image I is multi-valued image data in a gray scale, whose one pixel is expressed by 8 bits. However, the present invention is not limited to this, but multi-valued image data in a gray scale having other numbers of bits may be used. Further, in a case where color image data consisting of plural color components is inputted, one or plural color components of the image data may be selected as input image data. Furthermore, in a case of a color image, a color difference component of the color image may be thinned out and the thinned-out image data may be inputted. The image I is inputted to the frequency transformation unit 601.

First, the frequency transformation unit 601 is described. When the image I is inputted to the frequency transformation unit 601, the inputted image I is transformed to a frequency component and outputted as data F(I). As frequency transformation, various transformations, e.g., discrete cosine transformation, discrete wavelet transformation, Fourier transformation and so on, may be employed.

The case of using discrete cosine transformation is explained as an example. According to the discrete cosine transformation, an image is divided into blocks which do not overlap with each other, and transformation is performed in a block unit. Discrete cosine transformation is executed by the following equation.

$$Xi(u, v) = \frac{2}{N} C(u)C(v) \sum_u \sum_v x_i(m, n) \cos\left(\frac{(2m+1)u\pi}{2N}\right) \cos\left(\frac{(2n+1)v\pi}{2N}\right) \quad (3)$$

Note that xi is a pixel value before the transformation, Xi is a coefficient after the transformation, and N is a size of the block. When p=0, $C(p)=1/\sqrt{2}$ stands, and when p≠0, c(p)=1 stands. In general, photographic images are characterized by having a lot of low-frequency-component signals. Therefore, by performing discrete cosine transformation on a photographic image, the above characteristic of the photographic image can be expressed distinctively.

Next, the digital watermark extracting unit 602 is described. When the data F(I), which has been transformed to a frequency component, is inputted to the digital watermark extracting unit 602, additional information Inf embedded as a digital watermark is extracted based on the data F(I) and outputted. The digital watermark extracting processing executed by the digital watermark extracting unit 602 will be described later in detail.

Next, the digital watermark removing unit 603 is described. In the digital watermark removing unit 603, the data F(I) outputted from the frequency transformation unit 601 and the additional information Inf outputted from the extracting unit 602 are inputted. With the use of the additional information Inf, a digital watermark is removed from the data F(I) which has been transformed to a frequency component. Then, frequency component data F1(I), from which the digital watermark has been removed, is outputted. The digital watermark removing processing executed by the digital watermark removing unit 603 will be described later in detail.

Next, the quantization unit 604 is described. When the frequency component data F1(I) outputted from the digital watermark removing unit 603 is inputted to the quantization unit 604, the data F1(I) is subjected to quantization processing, and quantized data F2(I) is outputted. In a case where a general photographic image is inputted and subjected to discrete cosine transformation shown in equation (3) by the frequency transformation unit 601, the signals lean to the low-frequency component side. By performing quantization processing, a larger number of bits are allocated to low-frequency components and fewer number of bits are allocated to high-frequency components. As a result, more efficient compression encoding is possible. More specifically, an inputted coefficient is quantized by a predetermined quantization step, and an index corresponding to the quantization value is outputted. Quantization herein is executed by the following equation.

$$q = \text{sign}(c)\text{floor}(abs(c)/\Delta)$$

$$\text{sign}(c) = 1; c \geq 0$$

$$\text{sign}(c) = -1; c < 0 \quad (4)$$

Herein, c is a coefficient subjected to quantization. In this embodiment, a value of Δ includes 1. In this case, quantization is not actually performed, but the transformation coefficient inputted to the quantization unit 604 is directly outputted to the subsequent digital watermark embedding unit 605. The quantization step Δ is set small for a coefficient in a low-frequency region and set large for a coefficient in a high-frequency region, thereby realizing efficient quantization.

Next, the digital watermark embedding unit 605 is described. In the digital watermark embedding unit 605, the data F2(I) outputted from the preceding quantization unit 604 and the additional information Inf extracted by the preceding digital watermark extracting unit 602 are inputted. Then, the additional information Inf is embedded in the data F2(I) as a digital watermark, and data F3(I) in which additional information Inf has been embedded is outputted. The digital watermark embedding processing will be described later in detail.

Next, the entropy encoding unit 606 is described. When the data F3(I) outputted from the digital watermark embedding unit 605 is inputted to the entropy encoding unit 606, the data F3(I) is subjected to entropy encoding, and entropy-coded data F4(I) is outputted. Herein, a long coded word is assigned to data having a low occurrence probability, and a short coded word is assigned to data having a high occurrence probability, thereby enabling to make the average coded word length short. Huffman encoding, arithmetic encoding, run-length encoding, and combinations thereof may be employed as the entropy encoding.

As has been described above, according to the image encoding apparatus of the second embodiment, the image I in which the additional information Inf is embedded as a digital watermark can be encoded into the code stream F4(I) in which additional information Inf is embedded as a digital watermark. Furthermore, since the digital watermark is temporarily extracted and removed before quantization processing and embedded back to the image after the quantization processing, the digital watermark is not eliminated or destructed by the quantization processing. Therefore, additional information Inf embedded as a digital watermark can be correctly and entirely extracted from the code stream F4(I).

Digital Watermark Embedding/Extracting/Removing Processing

Next, digital watermark embedding, extracting, and removing processing according to the second embodiment are described.

Basically the same methods as that described in the first embodiment are applicable to the digital watermark embedding, extracting, and removing processing in the second embodiment. However in this embodiment, data subjected to digital watermark embedding, extracting, and removing processing is frequency component data which has been quantized. Therefore, when the method according to the first embodiment is to be applied, it is preferable to embed the frequency component subjected to embedding in the data having a relatively high-frequency component, taking the human visual characteristics into consideration. Furthermore, although the image encoding apparatus according to the second embodiment does not eliminate the digital watermark before or after encoding processing, the code stream outputted by the image encoding apparatus according to this embodiment may be exposed to an attack. To have a resistance to an attack, it is preferable to embed the frequency component in the data having a relatively low-frequency component. In other words, it is necessary to select a frequency component that is resistant to an attack and is difficult for humans to view.

Furthermore, $a_i$ in equations (1) and (2) is preferably a multiple number of $\Delta$ in equation (3). In this way, it is possible to execute digital watermark embedding without changing the bit allocated to each frequency component in the quantization processing.

Image Encoding Processing

Figure 7:
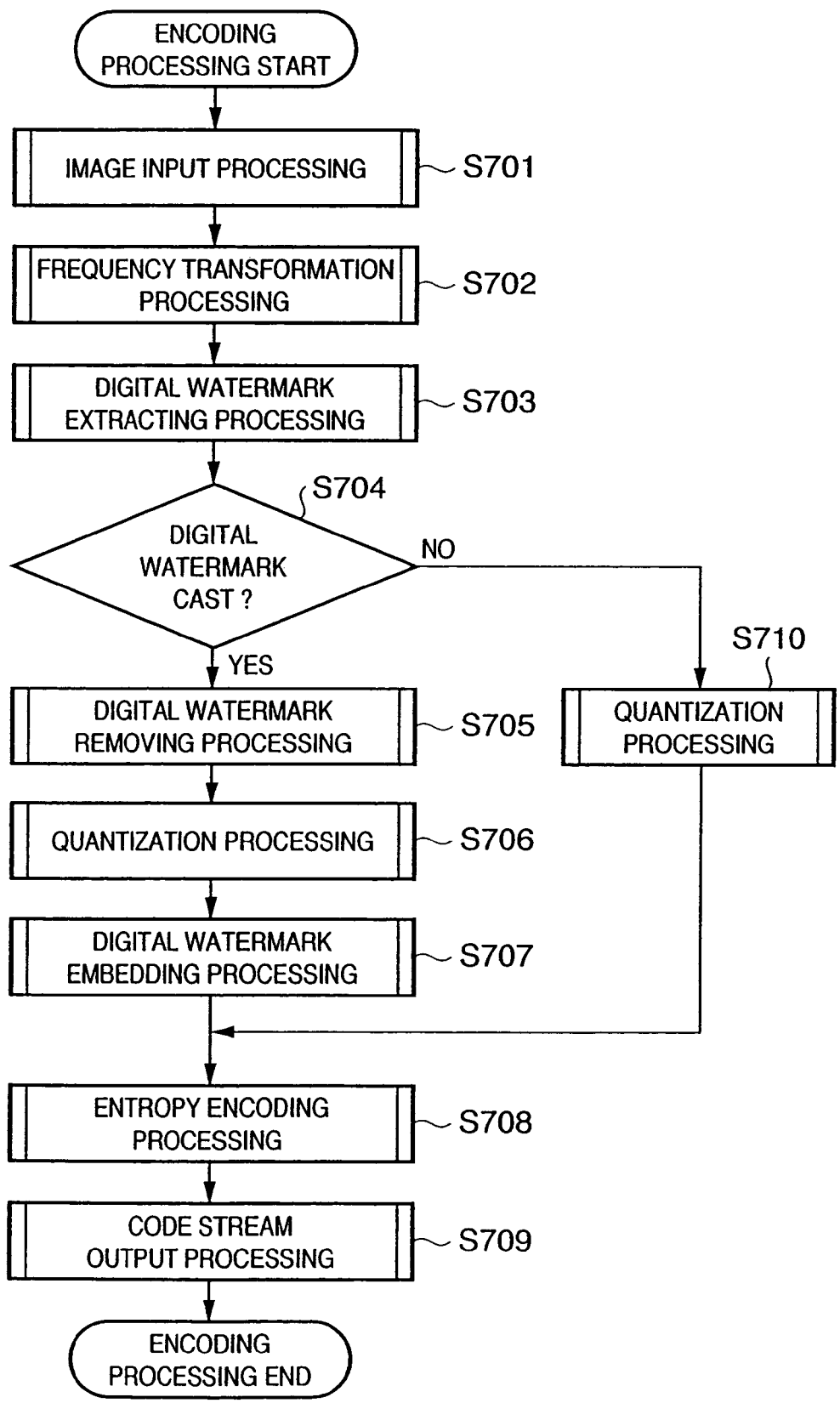
FIG. 7 is a flowchart describing image encoding processing according to the second embodiment.

Next, descriptions are provided with reference to FIG. 7 on the processing performed in a case where the image encoding apparatus described in the second embodiment is realized by software. FIG. 7 is a flowchart describing the image encoding processing according to the second embodiment.

First, image data I subjected to encoding is inputted (step S701). The inputted image data I is stored in the RAM 105. The inputted image data I is transformed to frequency component data (step S702). Additional information Inf embedded as a digital watermark is extracted from the frequency component data F(I) (step S703). The extracted additional information Inf is stored in the RAM 105. Then, it is determined whether or not a digital watermark is embedded in the image data I (step S704). If a digital watermark is embedded in the image data I, the digital watermark is removed from the data F(I) by using the extracted additional information Inf (step S705). The data F1(I) from which the digital watermark has been removed is subjected to quantization processing (step S706). The additional information Inf is embedded back to the quantized data F2(I) (step S707). Meanwhile, if a digital watermark is not embedded in the image data I, digital watermark removing processing is not performed, but quantization processing is performed (step S710). The data F3(I) in which a digital watermark is embedded or not embedded is subjected to entropy encoding processing (step S708). Finally, the entropy-coded data F4(I) is outputted (step S709).

Third Embodiment

The above-described second embodiment has described an image encoding apparatus where a digital watermark is embedded by using frequency regions. However, the present invention is not limited to this, but includes a case where a digital watermark is embedded by using spatial regions. The third embodiment provides an image encoding apparatus which can ensure correct extraction of an entire digital watermark from image data in a case where the image data including a digital watermark embedded with the use of a spatial region is encoded by irreversible compression.

Figure 8:
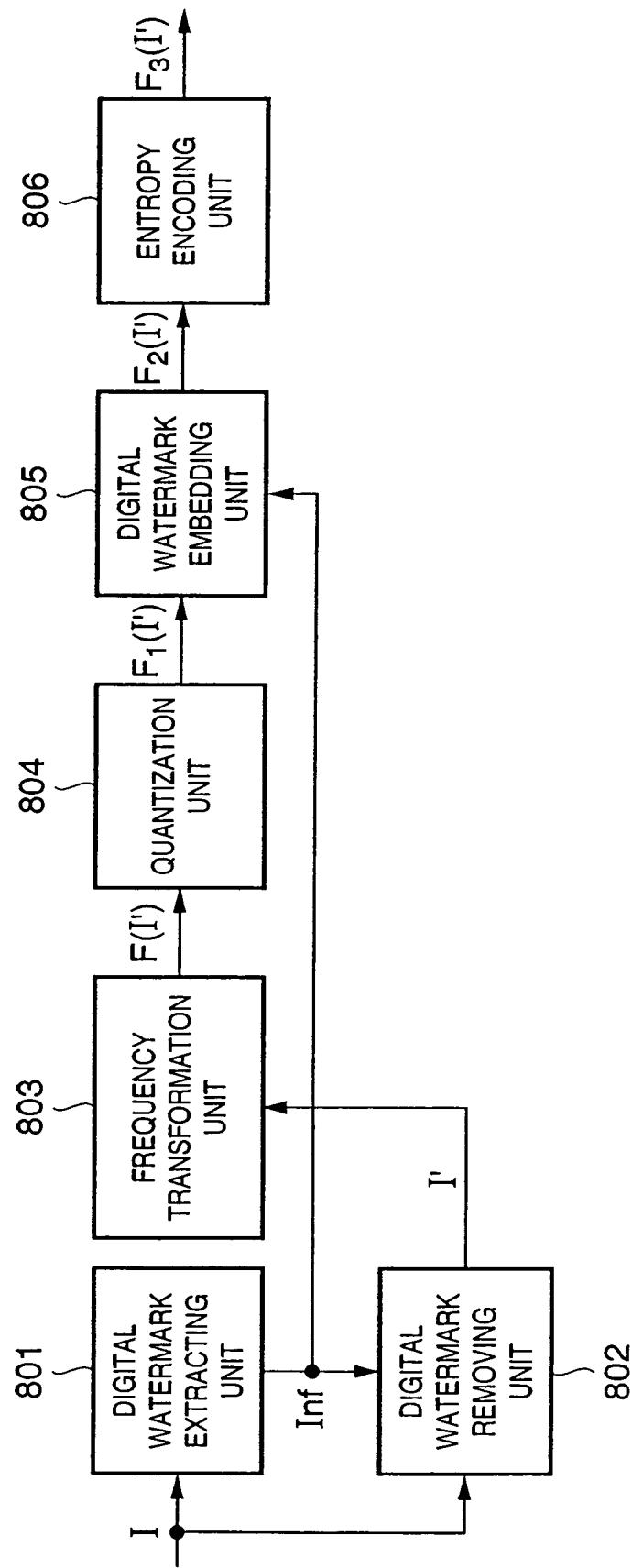
FIG. 8 is a block diagram showing an image encoding apparatus according to the third embodiment.

An image encoding apparatus shown in FIG. 8 comprises: a digital watermark extracting unit 801, digital watermark removing unit 802, frequency transformation unit 803, quantization unit 804, digital watermark embedding unit 805, and entropy encoding unit 806.

An image I is inputted to the image encoding apparatus. The same image I as that described in the second embodiment is applicable. Therefore, description thereof is not provided. The image I is inputted to the digital watermark extracting unit 801.

When the image I is inputted to the digital watermark extracting unit 801, additional information Inf embedded as a digital watermark is extracted from the image I, and the extracted additional information Inf is outputted. The same digital watermark extracting processing as that described in the first embodiment is executed by the digital watermark extracting unit 801. In other words, a digital watermark is extracted from spatial region data.

The image I and additional information Inf are inputted to the digital watermark removing unit 802, the additional information Inf embedded as a digital watermark is removed from the image I, and image data I', from which the additional information Inf has been removed, is outputted. The same digital watermark removing processing as that described in the first embodiment is executed by the digital watermark removing unit 802. In other words, the digital watermark is removed from the spatial region data.

The image I' is inputted to the frequency transformation unit 803, and transformed to frequency component data F(I'). The same frequency transformation processing as that described in the second embodiment is executed by the frequency transformation unit 803.

The frequency component data F(I') is inputted to the quantization unit 804 and subjected to quantization, and quantized data F1(I') is outputted. The same quantization processing as that described in the second embodiment is executed by the quantization unit 804.

The quantized data F1(I') and additional information Inf are inputted to the digital watermark embedding unit 805, and the additional information Inf is embedded in the quantized data F1(I') as a digital watermark, then data F2(I') in which additional information Inf has been embedded is outputted. The same digital watermark embedding processing as that described in the second embodiment is executed by the digital watermark embedding unit 805. In other words, a digital watermark is embedded in frequency region data.

The data F2(I') in which additional information Inf has been embedded is inputted to the entropy encoding unit 806 and subjected to entropy encoding processing, then entropy-coded data F3(I') is outputted. The same entropy encoding processing as that described in the second embodiment is executed by the entropy encoding unit 806.

As has been described above, according to the image encoding apparatus of the third embodiment, the image I in which the additional information Inf is embedded as a digital watermark can be encoded into the code stream F3(I') in which additional information Inf is embedded as a digital watermark. Furthermore, as similar to the second embodiment, since the digital watermark is temporarily extracted and removed before quantization processing and embedded back to the image after the quantization processing, the digital watermark is not eliminated or destructed by the quantization processing. Therefore, additional information Inf embedded as a digital watermark can be correctly and entirely extracted from the code stream F3(I').

Image Encoding Processing

Next, descriptions are provided with reference to FIG. 9 on the processing performed in a case where the image encoding apparatus according to the third embodiment is realized by software. FIG. 9 is a flowchart describing the image encoding processing according to the third embodiment.

First, image data I subjected to encoding is inputted (step S901). The inputted image data I is stored in the RAM 105. Additional information Inf embedded as a digital watermark is extracted from the inputted image data I (step S902). The extracted additional information Inf is stored in the RAM 105. Then, it is determined whether or not a digital watermark is embedded in the image data I (step S903). If a digital watermark is embedded in the image data I, the digital watermark is removed from the data I by using the extracted additional information Inf (step S904). The data I' from which the digital watermark has been removed is subjected to frequency transformation processing (step S905). The data F(I') in which frequency transformation has been performed is subjected to quantization processing (step S906). The extracted additional information Inf is embedded back as a digital watermark to the data F1(I'), on which quantization processing has been performed (step S907). Meanwhile, if a digital watermark is not embedded in the image data I, digital watermark removing processing is not performed, but frequency transformation processing and quantization processing are performed (steps S910 and S911). The data F2(I') in which a digital watermark is embedded or not embedded is subjected to entropy encoding processing (step S908). Finally, the entropy-coded data F3(I') is outputted (step S909).

Fourth Embodiment

In the foregoing second and third embodiments, a digital watermark is extracted and removed before quantization processing, and embedded back after the quantization processing. By virtue of this process, a digital watermark can be extracted entirely from the quantized data despite a data loss caused by the quantization processing. Herein, the quantization processing is irreversible processing for data compression. Although the second and third embodiments have described quantization processing as an example of irreversible processing, the present invention is not limited to this, but various irreversible processing are applicable. The irreversible processing includes an irreversible processing for data compression, such as a partial clipping of a code stream in entropy coding or a round-off error of a calculation in frequency transformation processing unit.

According to the present invention, by virtue of extracting and removing a digital watermark before irreversible processing and embedding it back after the irreversible processing, the digital watermark can be extracted entirely from the irreversible-processed data despite a data loss caused by the irreversible processing.

MODIFIED EXAMPLE

Note that although the above embodiments have described still-image data as an example of digital data, the present invention is not limited to this, but is applicable to various digital data, such as moving-image data, audio data, document data and so on.

The present invention can be applied as a part of a system constituted by a plurality of devices (e.g., host computer, interface, reader, printer) or as a part of an apparatus comprising a single device (e.g., copying machine, facsimile machine).

Further, the present invention is not limited to an apparatus or method realizing the above-described embodiments, but includes a case where the above-described embodiments are achieved by providing program codes of software, realizing the above-described embodiments, to a computer (CPU or MPU) of a system or apparatus, which causes the aforementioned devices to perform operation according to the program codes.

In this case, the program codes of the software realize the functions according to the foregoing embodiments, and the program codes as well as the devices for supplying the computer with the program codes, more specifically, a storage medium storing the program codes, constitute the present invention.

For a storage medium storing such program codes, a floppy disk, hard disk, optical disk, magneto-optical disk, CD-ROM, magnetic tape, non-volatile type memory card, ROM or the like can be used.

Furthermore, besides aforesaid functions according to the above embodiments are realized by controlling the devices according to the supplied program codes, the present invention also includes a case where the program codes realize the above-described embodiments in cooperation with an OS (operating system) or other application software working on the computer.

Furthermore, the present invention also includes a case where, after the supplied program codes are written in a function expansion card which is inserted into the computer or in a memory provided in a function expansion unit which is connected to the computer, a CPU or the like contained in the function expansion card or unit performs a part or the entire process in accordance with designations of the program codes and realizes the functions of the above embodiments.

As has been described above, according to the above-described embodiments, by virtue of extracting a digital watermark from digital data before executing arbitrary manipulation, editing, or compression processing, then temporarily removing the digital watermark (digital data before the digital watermark embedding is reconstructed), and embedding it back to the digital data after the manipulation, editing, or compression processing, it is possible to perform digital watermark embedding and extraction that correspond to arbitrary manipulation, editing, and compression.

The present invention is not limited to the above embodiments and various changes and modifications can be made within the spirit and scope of the present invention. Therefore, to apprise the public of the scope of the present invention, the following claims are made.

What is claimed is:

1. A data processing apparatus for performing manipulating or editing on digital data, comprising:
    a data input device arranged to input digital data in which a digital watermark is embedded by using a plurality of elements for at least 1 bit information;
    a key information input device arranged to input key information which designates an editorial right;
    a determination device arranged to determine whether or not the digital watermark is embedded in the input digital data based on the input digital data and the input key information by using a statistical method;
    a digital watermark removing device arranged to remove a digital watermark from the digital data in a case that said determination device determines that the digital watermark is embedded in the digital data;
    a manipulating/editing device arranged to manipulate or edit the digital data, from which the digital watermark has been removed by said digital watermark removing device;
    a digital watermark embedding device arranged to embed a digital watermark in the digital data, which has been manipulated or edited by said manipulating/editing device; and
    an output device arranged to output the digital data, in which the digital watermark has been embedded by said digital watermark embedding device.

2. The data processing apparatus according to claim 1, wherein said output device outputs the digital data, which is input by said data input device, in a case that said determination device determines that the digital watermark is not embedded in the digital data.

3. A data processing method comprising the following steps executed by a computer:
    an input step of inputting digital data in which a digital watermark is embedded by using a plurality of elements for at least 1 bit information;
    a key information input step of inputting key information which designates an editorial right;
    a determination step of determining whether or not the digital watermark is embedded in the input digital data based on the input digital data and the input key information by using a statistical method;
    a digital watermark removing step of removing a digital watermark from the digital data in a case that it is determined that the digital watermark is embedded in the digital data in said determination step;
    a manipulating/editing step of manipulating or editing the digital data, from which the digital watermark has been removed in said digital watermark removing step;
    a digital watermark embedding step of embedding as a digital watermark in the digital data, which has been manipulated or edited in said manipulation/editing step; and
    an output step of outputting the digital data, in which the digital watermark has been embedded by said digital watermark embedding step.

4. The data processing method according to claim 3, wherein the digital data which is input by said data input step is outputted in said output step in a case that it is determined that the digital watermark is not embedded in the digital data in said determination step.

5. A computer-readable medium embodying a program which causes a computer to execute:
    an input step of inputting digital data in which a digital watermark is embedded by using a plurality of elements for at least 1 bit information;
    a key information input step of inputting key information which designates an editorial right;
    a determination step of determining whether or not the digital watermark is embedded in the input digital data based on the input digital data and the input key information by using a statistical method;
    a digital watermark removing step of removing a digital watermark from the digital data in a case that it is determined that the digital watermark is embedded in the digital data in said determination step;
    a manipulating/editing step of manipulating or editing the digital data, from which the digital watermark has been removed in said digital watermark removing step;
    a digital watermark embedding step of embedding a digital watermark in the digital data, which has been manipulated or edited in said manipulation/editing step; and
    an output step of outputting the digital data, in which the digital watermark has been embedded by said digital watermark embedding step.

* * * * *